(12) United States Patent
Landge

(10) Patent No.: US 12,019,880 B2
(45) Date of Patent: Jun. 25, 2024

(54) FLASH MEMORY DATA PROTECTION USING BAD BLOCK MARKERS AND A FLASHING TOOL

(71) Applicant: QUALCOMM INCORPORATED, San Diego, CA (US)

(72) Inventor: Sudan Vilas Landge, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 17/489,035

(22) Filed: Sep. 29, 2021

(65) Prior Publication Data
US 2023/0102540 A1  Mar. 30, 2023

(51) Int. Cl.
G06F 3/06 (2006.01)

(52) U.S. Cl.
CPC .......... G06F 3/0622 (2013.01); G06F 3/0655 (2013.01); G06F 3/0679 (2013.01)

(58) Field of Classification Search
CPC ..... G06F 3/0622; G06F 3/0655; G06F 3/0679
See application file for complete search history.

(56) References Cited

U.S. PATENT DOCUMENTS

| | | | | |
|---|---|---|---|---|
| 2004/0064754 A1* | 4/2004 | Lee | ............... | G11B 20/1883 |
| 2004/0133734 A1* | 7/2004 | Jordan | ............... | G06F 12/1433 711/E12.1 |
| 2007/0050611 A1* | 3/2007 | Weikel | ............... | G06F 9/4406 713/2 |
| 2008/0086630 A1* | 4/2008 | Rodgers | ............... | G06F 21/575 713/2 |
| 2010/0205394 A1* | 8/2010 | Ise | ............... | G11C 8/12 711/E12.098 |
| 2013/0007545 A1* | 1/2013 | Galbraith | ............ | G06F 11/1092 714/E11.159 |
| 2014/0281260 A1* | 9/2014 | Peterson | ............... | G06F 3/0679 711/135 |
| 2016/0124847 A1* | 5/2016 | Malwankar | ............... | G06F 9/00 711/103 |
| 2018/0232169 A1* | 8/2018 | Liang | ............... | G06F 3/0629 |

FOREIGN PATENT DOCUMENTS

CN            106648942 A      5/2017

OTHER PUBLICATIONS

Related PCT Pat. App. Ser. No. PCT/US2022/041918, filed on Aug. 29, 2022, ISA/210 & ISA/220 & ISA/237 forms—Written Opinion of the EPO acting as the International Searching Authority (ISA), transmitted on Dec. 19, 2022—12 Pages.

* cited by examiner

*Primary Examiner* — Jane W Benner
(74) *Attorney, Agent, or Firm* — Smith Tempel Blaha LLC/Qualcomm

(57) ABSTRACT

Accessing protected data in a flash memory device of a computing device may include determining a location of a block in the flash memory device using dummy bad block indicator information. The block also may have a bad block marker stored in it. Data stored in data portions of pages of the block may then be read.

19 Claims, 12 Drawing Sheets

FLASH MEMORY DATA PROTECTION USING BAD BLOCK MARKERS AND A FLASHING TOOL

DESCRIPTION OF THE RELATED ART

A computing device may include multiple subsystems that communicate with one another. Such a computing device may be, for example, a portable computing device ("PCD"), such as a laptop or palmtop computer, a cellular telephone (i.e., smartphone), portable digital assistant, portable game console, etc. Still other types of PCDs may be used in automotive and Internet-of-Things ("IoT") applications.

The communicating subsystems may be included within the same integrated circuit chip or in different chips. A "system-on-a-chip" or "SoC" is an example of one such chip that integrates numerous components to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other subsystems, such as a transceiver or "modem" subsystem that provides wireless connectivity, a memory subsystem, etc.

A memory subsystem may include volatile memory, such as dynamic random access memory ("DRAM"). In addition, or alternatively, a memory subsystem may include non-volatile memory, such as flash memory.

Traditionally, a flash memory device consisted of a storage array (e.g., NAND or NOR storage cells) in the form of a single physical partition. A memory client may access the entire storage array without restrictions, other than those based on access permissions that may be imposed by an operating system or similar software.

So-called "managed" flash memory devices have been developed that include integrated controllers configured to automatically perform flash-related tasks such as garbage collection. Managed flash memory devices commonly have storage arrays with multiple physical partitions, access to which is controlled by the integrated controller. The integrated controller may prevent memory client access to partitions in which sensitive system data is stored. In contrast, the above-referenced traditional, unmanaged (also referred to as "raw") flash memory devices do not inherently include any protection against inadvertent or malicious access to sensitive system data. For example, if proper operating system access permissions are not in place, system data could inadvertently be erased if a memory client performs an erase operation on the entire flash memory.

SUMMARY OF THE DISCLOSURE

Systems, methods, computer-readable media, and other examples are disclosed for protecting and accessing protected data in a flash memory of a computing device.

An exemplary method for accessing protected data in a flash memory of a computing device may include determining a location of a block in the flash memory using dummy bad block indicator information. The block also may have a bad block marker stored in it. The exemplary method may further include reading data stored in data portions of a plurality of pages of the block.

Another exemplary system for accessing protected data in a flash memory of a computing device may include an unmanaged flash memory device and a processor. The processor may be configured to determine a location of a block in the flash memory using dummy bad block indicator information. The block also may have a bad block marker stored in it. The processor may further be configured to read data stored in data portions of a plurality of pages of the block.

Another exemplary system for accessing protected data in a flash memory of a computing device may include means for determining a location of a block in the flash memory using dummy bad block indicator information. The block also may have a bad block marker stored in it. The exemplary system may further include means for reading data stored in data portions of a plurality of pages of the block.

An exemplary unmanaged flash memory device may include an interface coupled to a memory controller, and a flash storage medium. The flash storage medium may comprise a plurality of blocks, and each block may comprise a plurality of pages. A portion of the plurality of blocks may comprise a protected data region. A bad block marker may be stored in a bad block marker portion of each block of the portion of the plurality of block. Dummy bad block indicator information may be stored in a data portion of a page of each block having the bad block marker stored in the bad block marker portion of the block.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
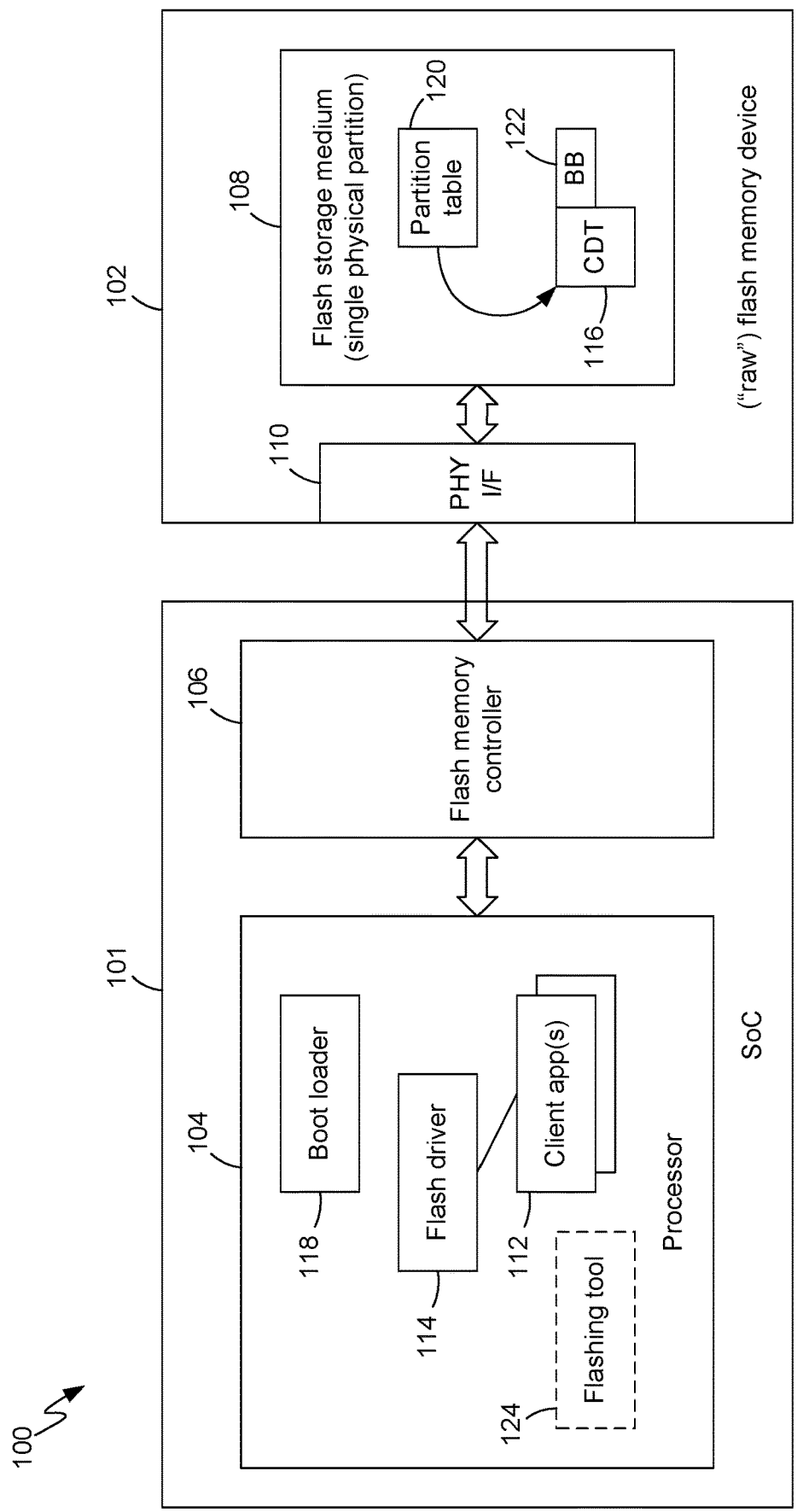
FIG. 1 is a block diagram illustrating a system for protecting and accessing data in a flash memory, in accordance with exemplary embodiments.

As illustrated in FIG. 1, in an illustrative or exemplary embodiment, a system 100 for protecting and accessing data in a flash memory device 102 may include a processor 104 and a flash memory controller 106 configured to couple or interface the processor 104 and the flash memory device 102. The processor 104 and flash memory controller 106 may be included in an SoC 101. The flash memory device 102 may be an unmanaged or "raw" type of flash memory device. Although not shown in FIG. 1 for purposes of clarity, the system 100 may be included in a computing device, which may be of any type. The processor 104 serves as an example of one of any number of processors or processing systems (e.g., on the SoC 101) that can be configured by operation of software or firmware to access the flash memory device 102. The processor 104 may be, for example, a CPU (sometimes also referred to as an applications processor), a GPU, an NPU, a DSP, a modem, etc.

The terms "unmanaged" and "raw" are used in this disclosure to refer to a flash memory device having a flash storage medium 108 (i.e., one or more arrays of, for example, NAND flash storage cells) but no managed flash control logic. An unmanaged or raw flash memory device may be contrasted with a managed flash memory device (not shown). As understood by one of ordinary skill in the art, a managed flash memory device includes managed flash control logic coupled to the flash storage medium, generally within the same physical package. Examples of managed flash memory devices include Universal Flash Storage ("UFS"), Embedded Multi-media Card ("eMMC"), Non-volatile Memory Express ("NVMe"), etc.

The managed flash control logic commonly includes a Flash Translation Layer ("FTL") that enables a host system (on which memory clients may execute) to interact with the managed flash memory device in a manner similar to that in which host systems have traditionally interacted with disk drives and other storage peripherals. Accordingly, some of the commands in the high-level command set recognized by a managed flash memory device are rooted in traditional disk drive commands. In addition, the FTL may perform some operations automatically and in the background (i.e., transparently to a memory client), thereby relieving the client or any external memory controller of such tasks. Such FTL operations or tasks may include logical-to-physical block address mapping, wear-leveling, bad block management, and garbage collection, among others. Managed flash devices may have multiple physical partitions that may be used in a manner similar to logical units ("LUN"s) in traditional storage peripherals such as disk drives.

In a managed flash device, the control logic prevents memory clients from writing to or otherwise erasing certain "protected" physical partitions in the flash storage medium. A host system may use such protected physical partitions to store sensitive system data, such as hardware configuration settings (which notably may include a Configuration Data Table or "CDT") used during computing device boot, factory settings such as Media Access Control ("MAC") addresses, etc. Depending on the type of managed flash device, such physical partitions may be protected by various means, such as, for example, one-time-programmable ("OTP") logic circuitry.

In contrast with a managed flash memory device (not shown), the unmanaged or raw flash memory device 102 (FIG. 1) includes essentially only the flash storage medium 108 but may also include a physical interface 110 or other circuitry that does not perform flash management or high-level command functions of the types described above with regard to managed flash memory. The flash storage medium 108 does not have multiple physical partitions but rather consists essentially of only a single physical region. The unmanaged or raw flash memory device 102 may be provided instead of a managed flash memory device (not shown) for various reasons, which may include that unmanaged flash memory devices are generally more economical. Saving bill-of-materials cost may be a consideration in, for example, IoT computing devices.

Being of the unmanaged or raw type, the flash memory device 102 does not inherently provide any protection against a memory client erasing some or all of the flash storage medium 108. Accordingly, but for the features described below relating to "dummy" bad blocks, and absent proper access protection provided by an operating system or similar system software or hardware, a memory client could erase some or all of the flash storage medium 108. Although malicious erasure is clearly a concern, inadvertent erasure is also a concern. Inadvertent erasure of system information needed, for example, for proper booting of the computing device, such as, for example, CDT or other hardware configuration settings, could render the computing device unusable. For these reasons, it would be desirable to protect certain information stored in unmanaged or raw flash memory.

In accordance with exemplary embodiments described herein, client applications (i.e., memory clients) 112 that adhere to bad block conventions are generally unable to erase data stored in what are referred to herein as dummy bad blocks in the flash storage medium 108. Such client applications 112 may execute on the processor 104 or other processor and may use a flash driver 114 to access the flash memory device 102. Although for purposes of clarity the flash driver 114 is conceptually depicted in FIG. 1 as executing on the processor 104, the flash driver 114 alternatively may execute on the flash controller 106. As such a flash driver 114 is well understood by one of ordinary skill in the art, details of the flash driver 114 are not described herein. Nevertheless, it may be appreciated that the flash driver 114 may perform some of the flash-related functions described above, such as bad block management. As understood by one of ordinary skill in the art, flash memory has a limited lifetime in terms of number of program/erase ("P/E") cycles. Flash memory blocks can only be erased a limited number of times before they degrade and become likely to fail. The individual pages within a block similarly can only be programmed a limited number of times. One function of the flash driver 114, referred to as bad block management, may be to maintain a count of P/E cycles and mark blocks as "bad" when a threshold is reached. Another function of the flash driver 114 may be to check whether a block is marked as bad before attempting to program any page in the block (e.g., in response to a write request from a client application 112). Client applications 112 that adhere to bad block conventions generally do not perform the P/E operation if the check indicates the block is bad. It may be noted that while there is a limit on P/E cycles, there is no limit on the number of reads, and the flash driver 114 does not prevent a block marked as bad from being read. The term "bad block," as used herein, is not intended to be limited to a particular type of flash memory, such as NAND flash, etc.; rather, the term "bad block" broadly refers to a conventionally unusable block in any type of flash memory.

An example of data that may be desirable to store in the flash memory device 102 in a protected manner is a CDT 116. It should be understood that the CDT 116 is only an example used for purposes of illustration in the following descriptions, and there may be other examples, such as MAC addresses or other low-level system information. A provider of the SoC 101 may desire to prevent users, developers, or other unauthorized parties from accessing such information in the flash memory device 102. As understood by one of ordinary skill in the art, the CDT 116 may include configuration data used by a boot loader 118. For example, the boot loader 118 may store such configuration data in hardware registers of various processing systems as part of the process of booting the computing device (not shown in FIG. 1).

As the CDT 116 in its original or native form is a table (details of which are not shown for purposes of clarity), it may be appreciated that the CDT 116 comprises an ordered collection of data. That is, in its original or native (table) form, the CDT 116 presents its contents in an order, such as a first row, a second row, a third row, etc., and the order may be preserved or otherwise indicated by techniques described below for storing the CDT data (i.e., the contents of the CDT 116) in the flash storage medium 108. Nevertheless, in other embodiments (not shown) the data to be stored may have no particular order in its original or native form.

In some examples of systems, methods, etc., for accessing protected data in the flash memory device 102, the location of the CDT 116 or other protected data may be obtained from a partition table 120. The partition table 120 may store addresses of various logical partitions of the flash storage medium 108 so that software entities (e.g., the client applications 112, the boot loader 118, etc.) can determine the locations of data they may need to access. For example, the boot loader 118 may look up in the partition table 120 the location of the partition in which the CDT 116 is stored. It may be noted that while the flash storage medium 108 has only a single physical partition, any number of logical partitions may be defined in the flash storage medium 108. The CDT 116 may be stored in a first such logical partition, while a second type of protected data may be stored in a second such logical partition, a third type of protected data may be stored in a third such logical partition, etc. Nevertheless, in some examples more than one type of protected data may be stored in the same logical partition.

As described below in further detail, the CDT 116 may be protected by storing it in dummy bad blocks. The term "dummy bad block" refers to a block marked as bad or unusable by a bad block ("BB") flag or marker 122 and having a location in the flash storage medium 108 indicated by dummy bad block indicator information. In examples of systems, methods, etc., for accessing protected data in which the location of the CDT 116 or other protected data may be obtained from the partition table 120, the dummy bad block indicator information may comprise the location obtained from the partition table 120.

A software entity that may be referred to as a flashing tool 124 may be used to store data to be protected, such as the CDT 116, set the bad block marker 122 associated with that data, and store the dummy bad block indicator information associated with that data in the partition table 120. For example, a provider of the SoC 101 or the computing device in which the SoC 101 and flash memory device 102 are included may operate the flashing tool 124. Although for purposes of clarity the flashing tool 124 is conceptually depicted in FIG. 1 as operating or executing on the processor 104, such a flashing tool may be executed on another processor.

Figure 2:
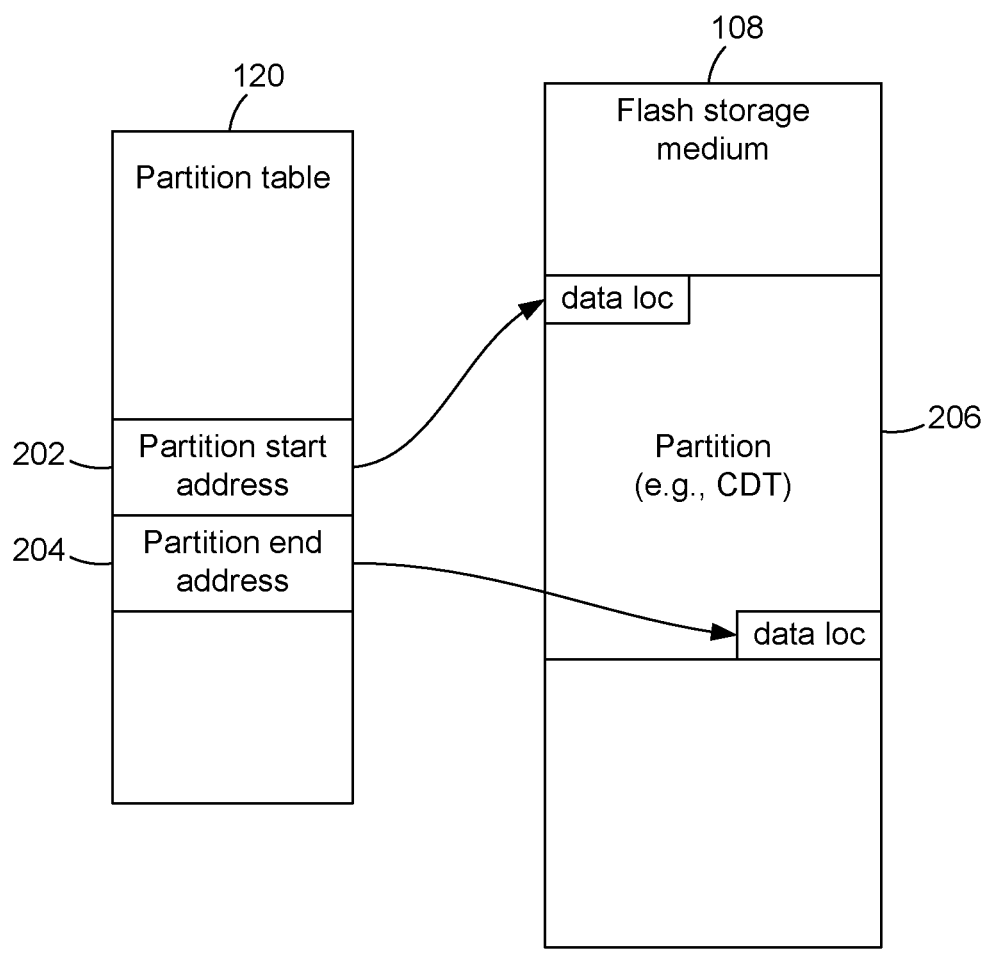
FIG. 2 is a block diagram illustrating a partition table and flash storage medium, in accordance with exemplary embodiments.

In an example illustrated in FIG. 2 the partition table 120 may contain a partition start address 202 and a partition end address 204 that together describe a range of addresses or data locations in the flash storage medium 108 of a partition 206. That is, the partition start address 202 and partition end address 204 may be the data locations where the first and last blocks, respectively, of the partition 206 are stored in the flash storage medium 108. Alternatively, a partition table (not shown) may contain a partition start address and, instead of a partition end address, a partition size. The range of data locations of the partition 206 may be used to store the above-described CDT 116 or other data to be protected.

Figure 3:
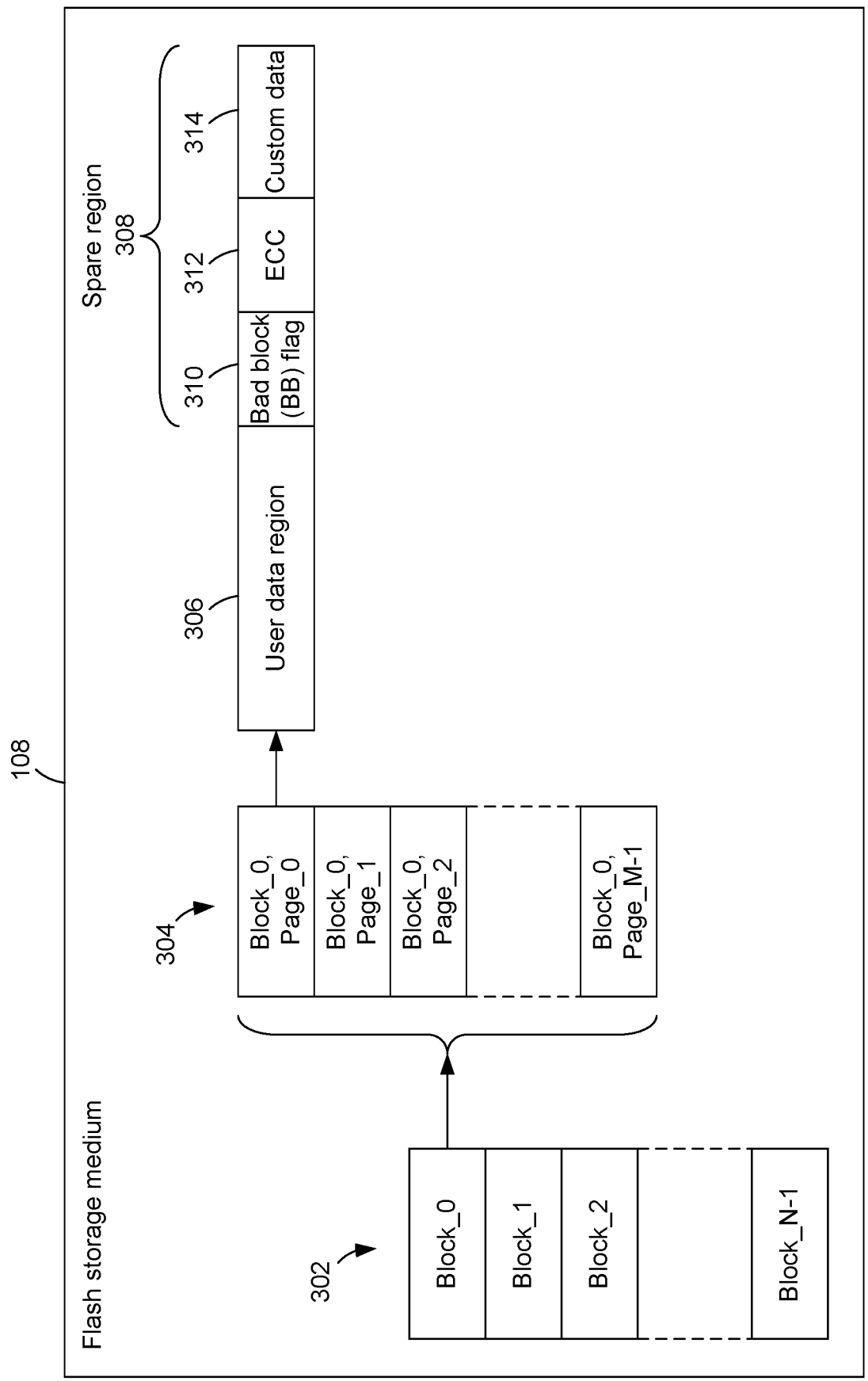
FIG. 3 is an organizational diagram of the flash memory device of FIG. 1, in accordance with exemplary embodiments.

As illustrated in FIG. 3, the flash storage medium 108 may be organized as a number ("N") of blocks 302. For example, the flash storage medium 108 may have 2048 blocks. Each block 302 may be organized as a number ("M") of pages 304. For example, each block 302 may have 64 pages 304. Thus, a first block may be referred to as Block_0, a second block may be referred to as Block_1, a third block may be referred to as Block_2, etc., through the (N-1)th block, which may be referred to as Block_N-1. Similarly, a first page may be referred to as Page_0, a second page may be referred to as Page_1, a third Page may be referred to as Page_2, etc., through the (M-1)th page, which may be referred to as Page_M-1. Each page 304 may comprise a user data region 306 and a spare region 308. The user data region 306 may be used (e.g., by the flashing tool 124 (FIG. 1) or other software entity) to store any type of data, including data to be protected in the manner described herein. The spare region 308 may be configured as three sub-regions: a bad block sub-region 310 configured to store a bad block flag or marker, an error-correcting code ("ECC") sub-region region 312 configured to store an ECC value for the data stored in the data region 306, and a custom data sub-region 314 that may be used for various purposes, such as garbage collection, wear-leveling, etc., as understood by one of ordinary skill in the art.

Figure 4:
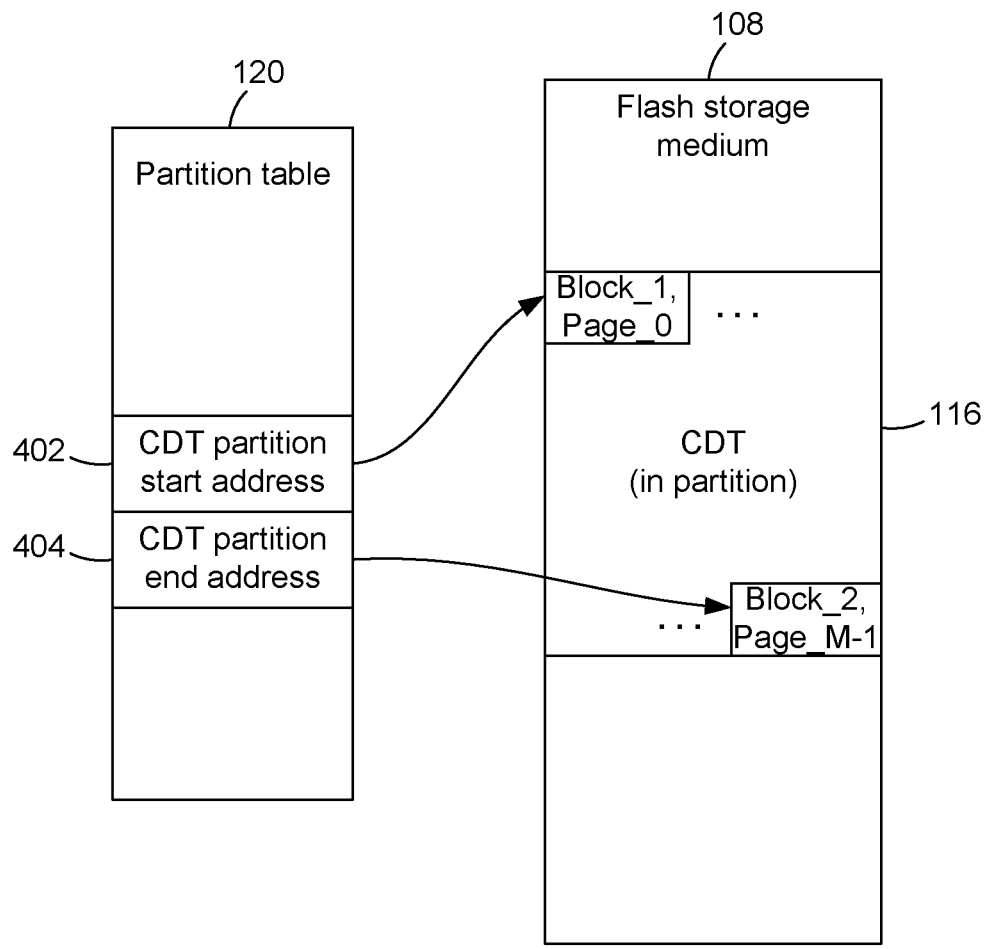
FIG. 4 is similar to FIG. 2, illustrating an example in which a Configuration Data Table ("CDT") is stored in a partition of the flash storage medium.

In FIG. 4, an example is illustrated in which the partition table 120 contains a CDT partition start address 402 of Page_0 of Block_1 and a CDT partition end address 404 of Page_M-1 of Block_2. Thus, in this example the CDT 116 spans the locations (a single logical partition) in the flash storage medium 108 from Page_0 of Block_1 to Page_M-1 of Block_2. Block_1 and Block_2 are used only as examples, and in other examples (not shown), such a partition could span any block or any two or more contiguous blocks from Block_0 to Block_N-1.

Figure 5:
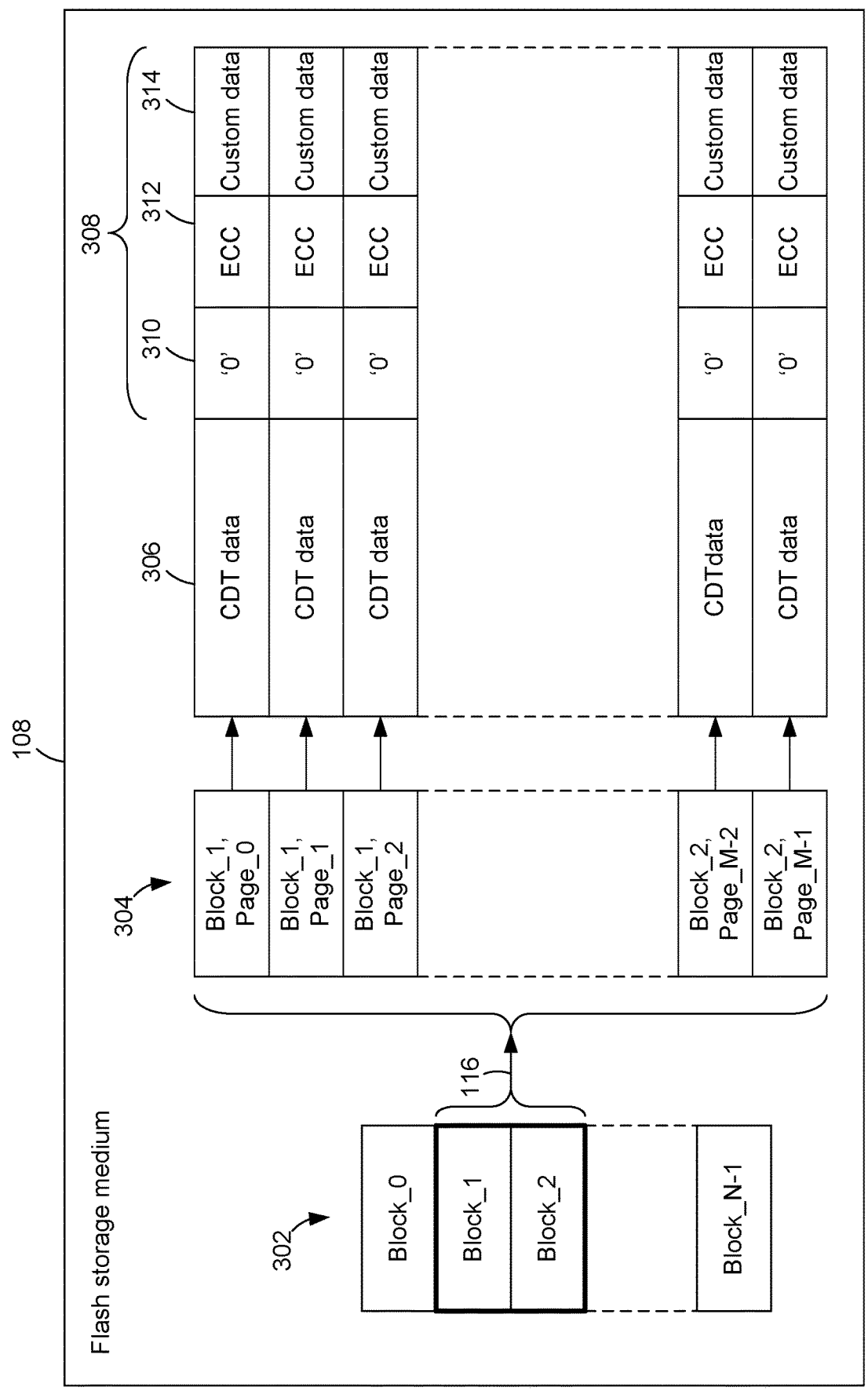
FIG. 5 is similar to FIG. 3, illustrating an example in which a CDT is stored in the flash storage medium.

In FIG. 5, the same example is illustrated with the relevant contents of the flash storage medium 108 shown at a page level. In the illustrated example, the CDT data (i.e., the contents of the above-described CDT 116) is stored in the user data region 306 of each page from Page_0 of Block_1 to Page_M-1 of Block_2. (In FIG. 5, the partition in which the blocks 302 containing the CDT 116 are stored is indicated in bold line for clarity.) To protect the CDT data stored in the user data regions 306, a bad block marker is correspondingly stored in the bad block sub-region 310 of each page from Page_0 of Block_1 to Page_M-1 of Block_2. The bad block marker may have a value of zero in embodiments in which the client applications 112 or flash driver 114 (FIG.

1) interpret a value of zero in the bad block sub-region 310 as meaning that the block is bad and is therefore not to be erased or programmed. In embodiments in which each data access is eight bits, 0x00 (hexadecimal notation) may be stored, while in embodiments in which each data access is 16 bits, 0x0000 may be stored. A different value in the bad block sub-region 310, such as, for example, 0xFF in the case of 8-bit embodiments or 0xFFFF in the case of 16-bit embodiments, may indicate to the client applications 112 or flash driver 114 that the block is not bad and may therefore be erased and programmed. Nevertheless, in still other embodiments such a bad block marker may have any value so long as the client applications or the flash driver supporting the client applications interpret that value as meaning that the block is bad and is therefore not to be erased or programmed.

All of the pages from Page_0 of Block_1 to Page_M-1 of Block_2 in this example are dummy bad blocks (and not actual bad blocks) because, despite the bad block marker indicating a bad block, it can be determined from the partition table 120 that the CDT 116 is located from Page_0 of Block_1 to Page_M-1 of Block_2. In other words, in this example the CDT block location information in the partition table 120 serves as dummy bad block indicator information to indicate that, despite the bad block markers indicating bad blocks, the CDT 116 can be read from the indicated blocks. Although not related to protecting the CDT data using the above-described dummy bad block technique, it may be noted that ECC data corresponding to the CDT data stored in user data regions 306 may be stored in the ECC sub-regions 312. The custom data sub-regions 314 are not used in this example.

Figure 6:
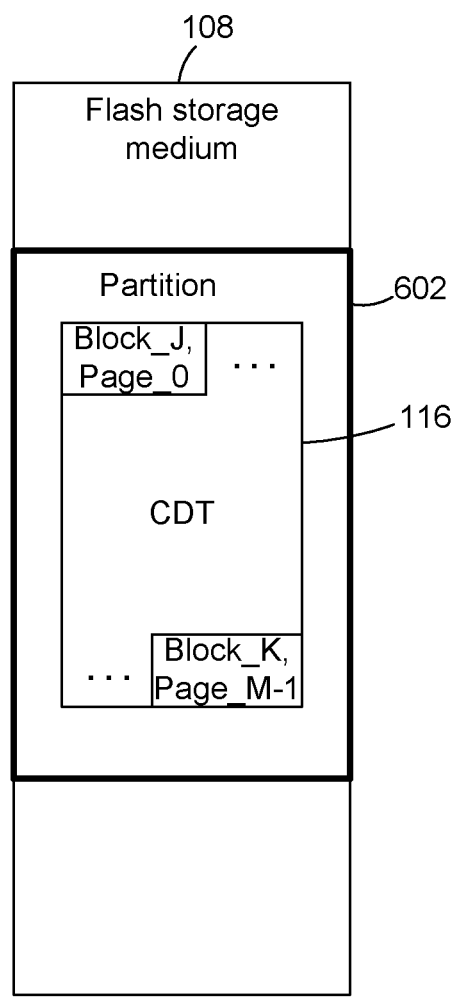
FIG. 6 is similar to FIG. 4, illustrating an example in which a CDT is stored within a larger partition of the flash storage medium.

In FIG. 6, another example is illustrated in which the CDT 116 or other data to be protected is stored within only a portion or subset of a larger logical partition 602 (indicated in bold line for clarity). In this example, the CDT 116 starts at a Block_J and ends at a Block_K in the flash storage medium 108. That is, the CDT 116 is located from Page_0 of Block_J to Page_M-1 of Block_K. The larger logical partition 602 may start at a block (not shown) preceding Block_J and end at a block (not shown) after Block_K.

Figure 7:
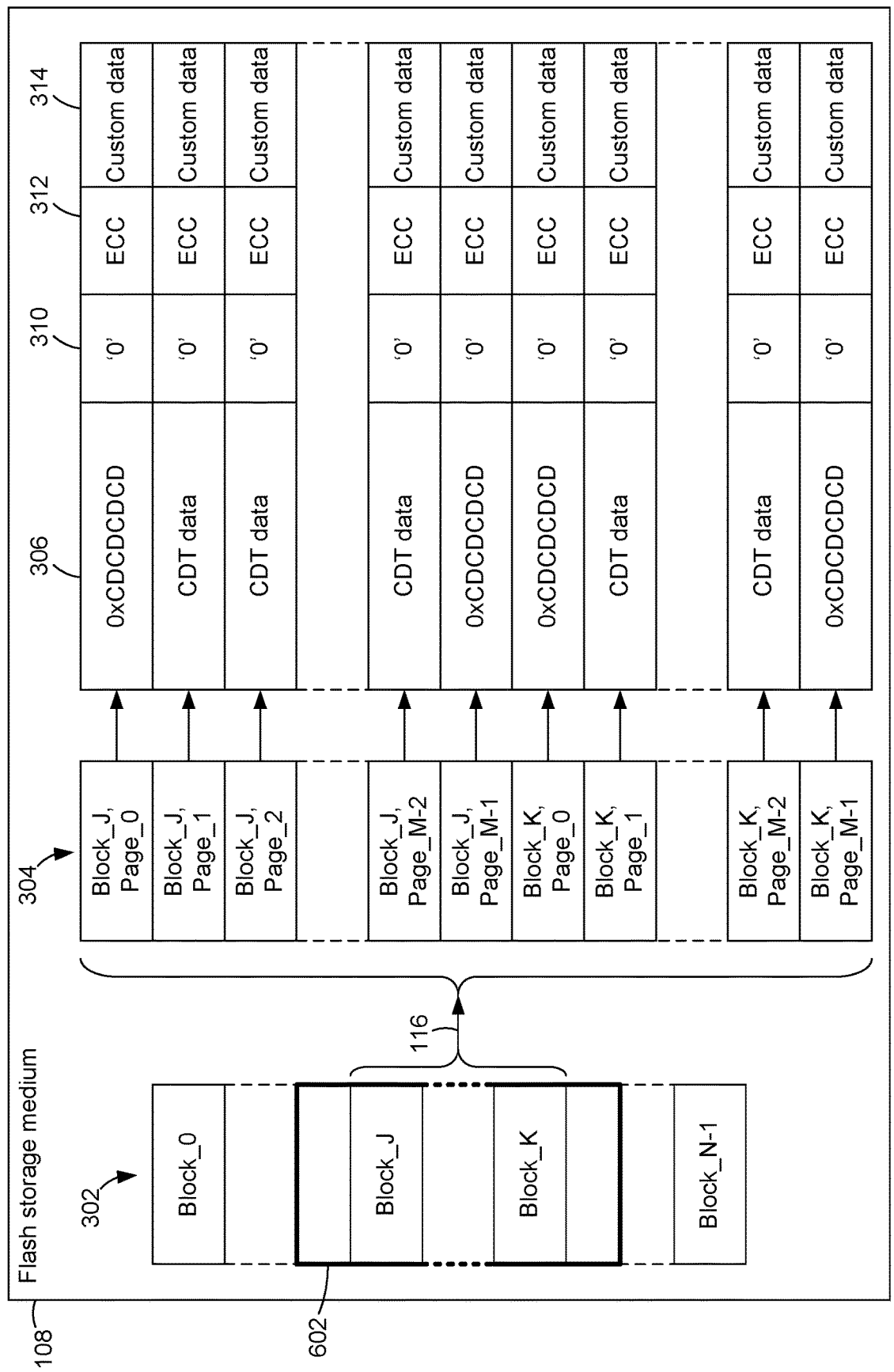
FIG. 7 is similar to FIG. 5, illustrating an example in which a CDT is stored within a larger partition of the flash storage medium.

In FIG. 7, the same example is illustrated with the relevant contents of the flash storage medium 108 shown at a page level. In the illustrated example, the CDT data (i.e., the contents of the CDT 116) is stored in the user data region 306 of each page from Page_1 (i.e., the second page) of Block_J to Page_M-2 (i.e., the second-to-last page) of Block_J, from Page_1 (i.e., the second page) of Block_K to Page_M-2 (i.e., the second-to-last page) of Block_K, and similarly in any other blocks (not shown) between Block_J and Block_K. In other words, in the example illustrated in FIG. 7 the CDT data is stored in the user data region 306 of all pages of the dummy bad blocks except the first page (Page_0) and the last page (Page_M-1). In the user data region 306 of the first page (Page_0) of each dummy bad block, unique dummy bad block indicator information serves as a preamble to indicate the start of a dummy bad block. Similarly, in the user data region 306 of the last page (Page_M-1) of each dummy bad block, the same unique dummy bad block indicator information may serve as a post-amble to indicate the end of the dummy bad block. Nevertheless, alternative examples (not shown) may instead store CDT data or other data to be protected in the user data region 306 of the last page, omitting a post-amble.

The preamble, post-amble or other bad block indicator information may be in the form of a unique data pattern. For example, the bad block indicator information may be a data value such as 0xCDCDCDCD. where the letters CD refer to "Configuration Data" or 0xDBDBDBDB, where the letters DB refer to "Dummy Block." Different data patterns or values may be used to indicate different types of data to be protected. For example, 0xDBCD may indicate a "Dummy Block" containing "Configuration Data" (i.e., CDT data,) while 0xDBAD may indicate a (e.g., MAC) address, etc.

To protect the CDT data stored in the user data regions 306, a bad block marker is correspondingly stored in the bad block sub-region 310 of each page from Page_0 of Block_J to Page_M-1 of Block_K. The bad block marker may have a value of zero (i.e., 0x00 or 0x0000) in embodiments in which client applications 112 (FIG. 1) interpret a value of zero in the bad block sub-region 310 as meaning that the block is bad and is therefore not to be erased or programmed. Another value in the bad block sub-region 310, such as, for example, 0xFF or 0xFFFF, may indicate to client applications 112 that the block is not bad and may therefore be erased and programmed.

All of the pages from Page_0 of Block_J to Page_M-1 of Block_K in this example are dummy bad blocks (and not actual bad blocks) because, despite the bad block marker indicating a bad block, it can be determined from the above-described preamble and post-amble where the CDT 116 begins and ends. In other words, in this example the pre-ambles and post-ambles serve as dummy bad block indicator information to indicate that, despite the bad block markers indicating bad blocks, the CDT 116 can be read from the indicated blocks.

Figure 8:
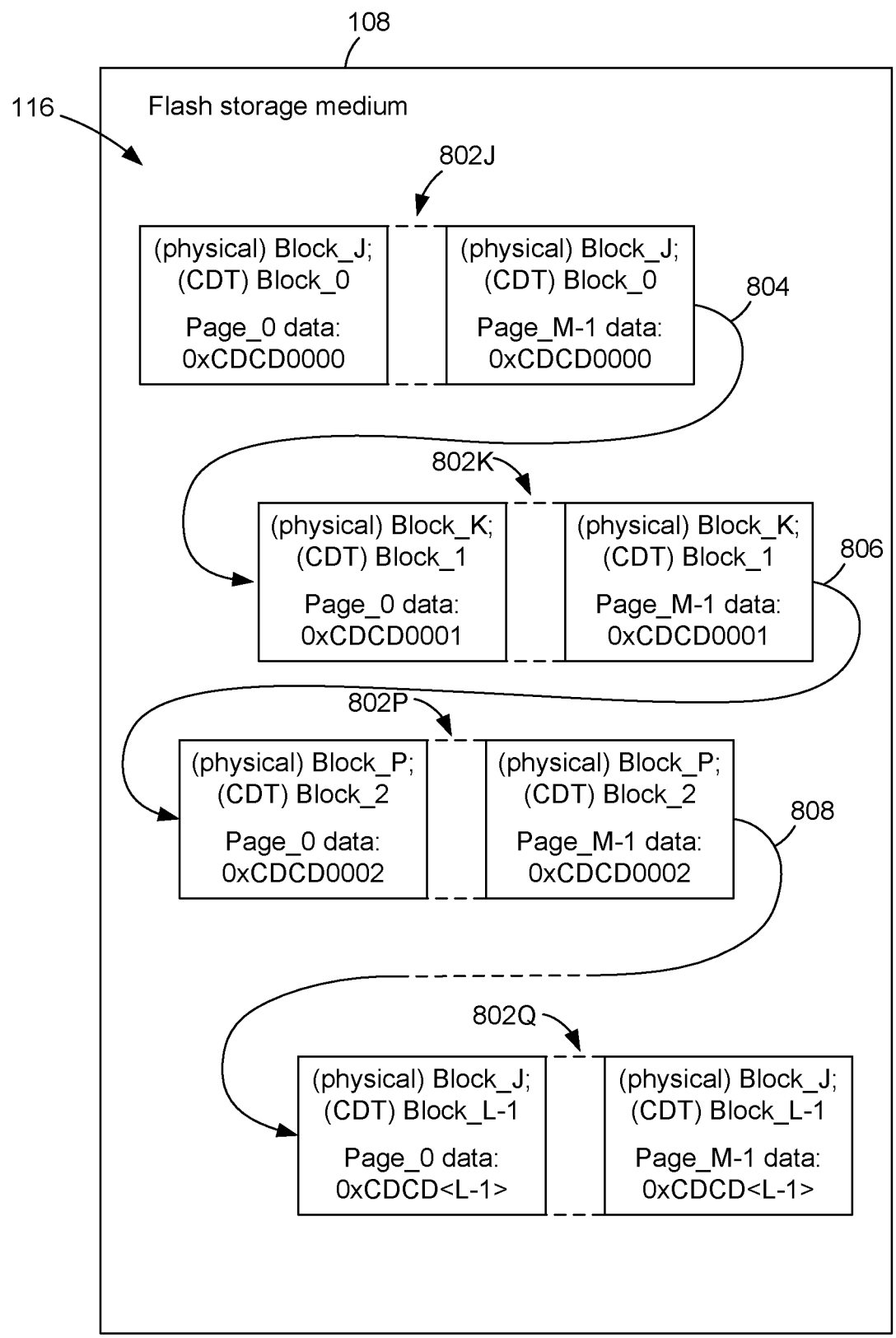
FIG. 8 illustrates a flash storage medium in which a CDT is stored in non-contiguous blocks, in accordance with exemplary embodiments.

In FIG. 8, another example is illustrated in which the CDT 116 or other data to be protected is stored in non-contiguous blocks of the flash storage medium 108. That is, in this example the logical partition containing the CDT 116 is distributed among non-contiguous blocks 802J, 802K, 802P, etc., through 802Q of the flash storage medium 108, where blocks 802J, 802K, 802P, etc., through 802Q are examples of the blocks 302 described above with regard to FIGS. 3, 5 and 7. Any of the blocks 802J, 802K, 802P, etc., through 802Q may be located anywhere (i.e., at any block addresses) in the flash storage medium 108; they are not all necessarily adjacent or contiguous. Block 802J, block 802K, block 802P, etc., through block 802Q may also be referred to as Block_J, Block_K, Block_P, etc., through Block_Q, respectively, denoting physical blocks of the flash storage medium 108, similar to Block_J and Block_K in the example described above with regard to FIGS. 6-7.

Any of the blocks 802J, 802K, 802P, etc., through 802Q of the flash storage medium 108 may store any portion of the CDT data (i.e., the content of the CDT 116). In the illustrated example, a first portion ("Block_0") of the CDT data is located starting at block 802J; then the next (as indicated by the arrow 804) portion ("Block_1") of the CDT data is located at block 802K; then the next (as indicated by the arrow 806) portion ("Block_2") of the CDT data is located at block 802P; and then the last (as indicated by the arrow 808, and via any number of intervening blocks (not shown)) portion ("Block_L-1") of the CDT data is located at block 802Q, where L is the size of the CDT data in blocks, and where the terms "first," "next" and "last" refer to the order in which the data is contiguously presented by the CDT 116. Note that although the various regions and sub-regions of Block 802J, block 802K, block 802P, etc., through block 802Q are not shown for purposes of clarity, bad block markers are stored in this example in the same manner as in the example described above with regard to FIGS. 5 and 7.

As in the example described above (FIG. 7), in this example (FIG. 8) the CDT data is stored in the user data region (not shown in FIG. 8) of all pages of the blocks 802J, 802K, 802P, etc., through 802Q except the first page (Page_0) and the last page (Page_M-1). That is, the CDT data is stored in the user data region of each page from Page_1 (i.e., the second page) to Page_M-2 (i.e., the second-to-last page) of each of the blocks 802J, 802K, 802P, etc., through 802Q. In the first page (Page_0) of each of the blocks 802J, 802K, 802P, etc., through 802Q, unique dummy bad block indicator information serves as a preamble to indicate the start of a dummy bad block. Similarly, in the last page (Page_M-1) of each of the blocks 802J, 802K, 802P, etc., through 802Q, the same unique dummy bad block indicator information may serve as a post-amble to indicate the end of the dummy bad block. Nevertheless, alternative examples (not shown) may instead store CDT data or other data to be protected in the user data region of the last page, omitting a post-amble.

In the example illustrated in FIG. 8, the preamble, post-amble or other dummy bad block indicator information may, in addition to including a unique data pattern such as 0xCDCD, include a value uniquely identifying a block-sized portion of the CDT data. For example, the dummy bad block indicator information stored in the first and last pages (Page_0 and Page_M-1) of block 802J may be a value of 0000 to identify or indicate that the first block of the CDT data is stored in block 802J; the dummy bad block indicator information stored in the first and last pages (Page_0 and Page_M-1) of block 802K may be a value of 0001 to identify or indicate that the second block of the CDT data is stored in block 802K; the dummy bad block indicator information stored in the first and last pages (Page_0 and Page_M-1) of block 802P may be a value of 0002 to identify or indicate that the third block of the CDT data is stored in block 802P; etc. The dummy bad block indicator information stored in the first and last pages (Page_0 and Page_M-1) of block 802Q may be a value of L-1 to identify or indicate that the last block of the CDT data is stored in block 802Q, where L is the size of the CDT data in blocks. Accordingly, in the example illustrated in FIG. 8 the dummy bad block indicator information stored in the user data regions (not separately shown) of the first and last pages of blocks 802J, 802K, 802P, etc., through 802Q may be 0xCDCD0000, 0xCDCD0001, 0xCDCD0002, etc., through 0xCDCD<L-1>, respectively.

The CDT data or other data may be (though, as described below, is not necessarily) stored in non-contiguous blocks of the flash memory in the same order in which the data is contiguously presented by the CDT 116 or other ordered collection of data (e.g., table, list, array, etc.). That is, the blocks may be stored in order of monotonically increasing or decreasing block address. For example, the second block of the CDT data may be stored in a block (e.g., Block_K) having a higher block address than the block address at which the first block (e.g., Block_J) of the CDT is stored; the third block of the CDT data may be stored in a block (e.g., Block_P) having a higher block address than the block address at which the second block (e.g., Block_K) of the CDT is stored; etc., where "first," "second," "third," "etc., refer to the order in which the data is contiguously presented by the CDT 116 in its original or native (table) form, even though the referenced block addresses may not be contiguous.

In another example similar to that described above with regard to FIG. 8, in which some or all of the CDT data or other data is stored in non-contiguous blocks of the flash storage medium, the blocks may form a linked list (not shown). Instead of the above-described value uniquely identifying a block of the CDT data, a pointer or link (not shown) to the address of the next block could be included. Still other ways of indicating an original or native order of data when it is stored in non-contiguous blocks of the flash storage medium will occur readily to one of ordinary skill in the art in view of the teachings and examples herein.

In view of the above-described techniques for indicating an original or native order of data stored in non-contiguous blocks of the flash storage medium, such as including values uniquely identifying portions of the data or forming a linked list, it may be appreciated that data may be stored in an order that is different from its original or native order. In other words, in some embodiments the block addresses at which successive (e.g., "first," "second," "third," "fourth," etc.) blocks of the CDT data or other ordered data are stored in the flash storage medium may not increase or decrease monotonically. In other words, any of the block addresses at which successive blocks of the CDT data or other ordered data are stored could be higher or lower than others.

Figure 9:
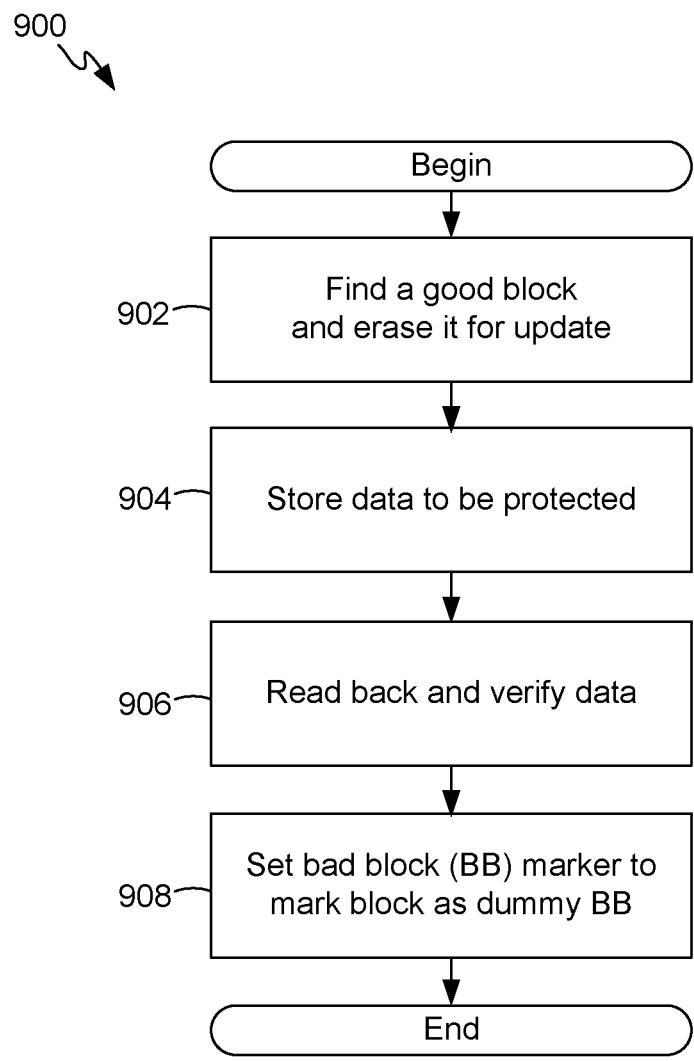
FIG. 9 is a flow diagram illustrating a method for protecting data in a flash memory device, in accordance with exemplary embodiments.

As illustrated in FIG. 9, an exemplary method for protecting data in a flash memory device of a computing device may include the following. The method 900 may be controlled by, for example, the above-described flashing tool 124 (FIG. 1). Although not shown for purposes of clarity, the method 900 also include determining how many flash memory blocks are needed to store the data to be protected. The method 900 may be applied to each of this number of flash memory blocks. As indicated by block 902, the flash memory may be tested in a conventional manner to determine which flash memory blocks are bad and which flash memory blocks are good (i.e., not bad). Flash memory blocks that are found to be good may be erased in preparation for storing the data to be protected.

As indicated by block 904, the data to be protected may be stored in the blocks. That is, pages of the blocks may be programmed. As described above with regard to FIGS. 4-5, in some embodiments the data to be protected may be stored in the user data region of all pages of a block. As described above with regard to FIGS. 6-7, in other embodiments the data to be protected may be stored in the user data region all pages of a block except the first page (or, alternatively, except the first and last pages), in which dummy bad block indicator information in the form of a unique data pattern may be stored instead. The ECC of the stored data may be correspondingly stored.

As indicated by block 906, the data that was stored may be read back to verify that it was stored correctly. Although not shown in FIG. 9, if the data that is read back does not match the data that was stored, storing the data may be re-attempted. If the data that is read back matches the data that was stored, the bad block marker may be set in each page in which the data was stored, as indicated by block 908. Although not shown in FIG. 9, in some embodiments the location of the stored data may be stored as an entry in a partition table. In such embodiments, such an entry in the partition table may serve as dummy bad block indicator information. The combination of a bad block marker and dummy bad block indicator information provides an indication that the block is a dummy bad block.

Referring briefly again to FIG. 1, a flash driver 114 that behaves in a conventional manner will generally not attempt to erase or program a block in which the client application 112 finds that the bad block marker has been set. Therefore, in response to a write request from a client application 112, the flash driver 114 will generally not write to (i.e., erase and program) the user data region of a dummy bad block, just as the flash driver 114 will generally not write to the user data region of an actual bad block. The data stored in the user data region of a dummy bad block is thus protected against erasure or reprogramming. It may be noted that a bad block marker does not prevent a memory client (e.g., via the flash driver 114) from reading a dummy bad block or an actual bad block.

Figure 10:
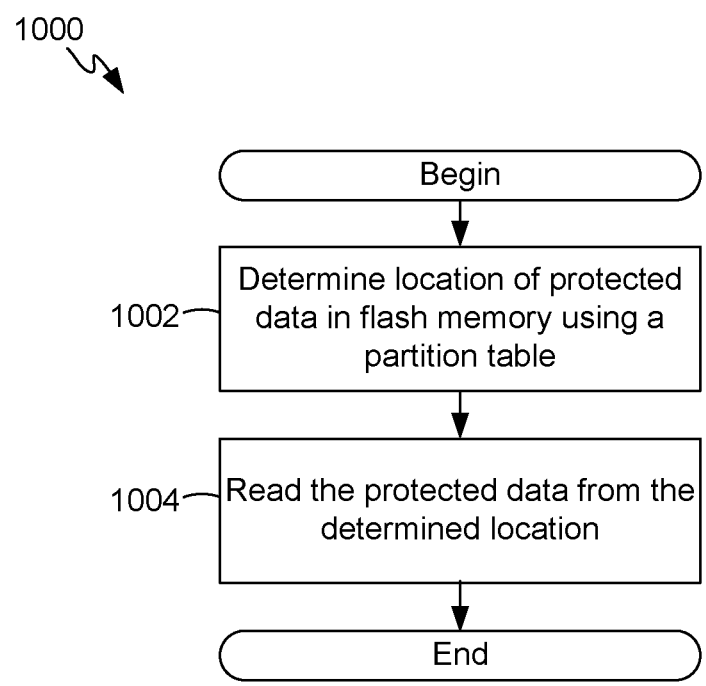
FIG. 10 is a flow diagram illustrating a method for accessing protected data in a flash memory device, in accordance with exemplary embodiments.

As illustrated in FIG. 10, an exemplary method 1000 for accessing protected data in a flash memory device of a computing device may include the following. As indicated by block 1002, the location of protected data in a flash memory device may be determined using a partition table or similar data structure. For example, the above-described boot loader 118 (FIG. 1) may look up in the partition table 120 the location of the CDT 116 in the flash memory device 102. The boot loader 118 may determine that the flash memory blocks in that location have bad block markers set. Nevertheless, the entry in the partition table 120 for the CDT 116, serving as dummy bad block indicator information in this embodiment, informs the boot loader 118 that those blocks are dummy bad blocks rather than actual bad blocks. Accordingly, as indicated by block 1004 the CDT 116 or other protected data may be read from the dummy bad blocks. The boot loader 118 may use configuration data from the CDT 116 to configure hardware registers or other logic as part of the process of booting the computing device. It should be understood that performing the method 1000 during booting of a computing device (e.g., under control of the boot loader 118) is intended only as an example, and that in other examples the method 1000 or a similar method may be performed at any time and under control of any processing element. Accordingly, it should also be understood that the CDT 116 is intended only as an example of protected data. In another example, the method 1000 could be used to read protected network calibration data (not shown) while the computing device is in operation.

Figure 11:
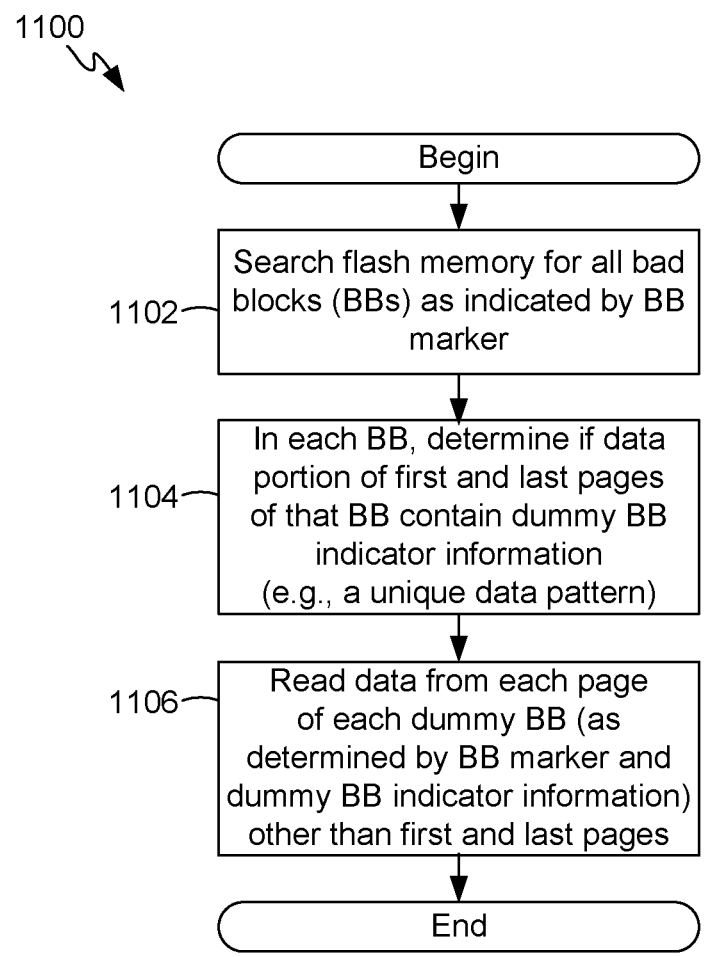
FIG. 11 is a flow diagram illustrating another method for accessing protected data in a flash memory device, in accordance with exemplary embodiments.

As illustrated in FIG. 11, another exemplary method 1100 for accessing protected data in a flash memory device of a computing device may include the following. The method 1100 may be performed during booting of a computing device or at any other time, for accessing any type of protected data. As indicated by block 1102, the location of protected data in a flash memory device may be determined by searching the flash memory device for all flash memory blocks having bad block markers set. As indicated by block 1104, in each bad block it may be determined whether the first page (or first and last pages) contains dummy bad block indicator information (e.g., a unique data pattern). A flash memory block having not only a bad block marker but also dummy bad block indicator information is a dummy bad block. As indicated by block 1106, the CDT 116 or other protected data may be read from the dummy bad blocks. As described above, the protected data may be read from pages of the dummy bad blocks other than the first page (or alternatively, other than the first and last pages), which instead contain the dummy bad block indicator information.

While in some embodiments reading the protected data may comprise reading individual blocks on an as-needed basis, in other embodiments all of the relevant protected data (e.g., all CDT data) may be read and re-stored (e.g., in the flash memory or other memory) in an original or native form, such as a table, list, array, etc., in preparation for use of the data. In embodiments in which the CDT data or other ordered data is stored in non-contiguous blocks of the flash storage medium, the data may be re-stored in its native form using the techniques described above with regard to FIG. 8. For example, the CDT data may be read and re-stored in the table form of the CDT 116 in an order indicated by values uniquely identifying the blocks of the CDT data. Alternatively, in other embodiments in which ordered data is stored in non-contiguous blocks, the blocks may be read in order of increasing or decreasing block address and re-stored in a contiguous form (e.g., table, list array, etc.) in the same order. In embodiments in which the blocks form a linked list, the blocks can be read and re-stored in a contiguous form in the order indicated by the linked list.

Figure 12:
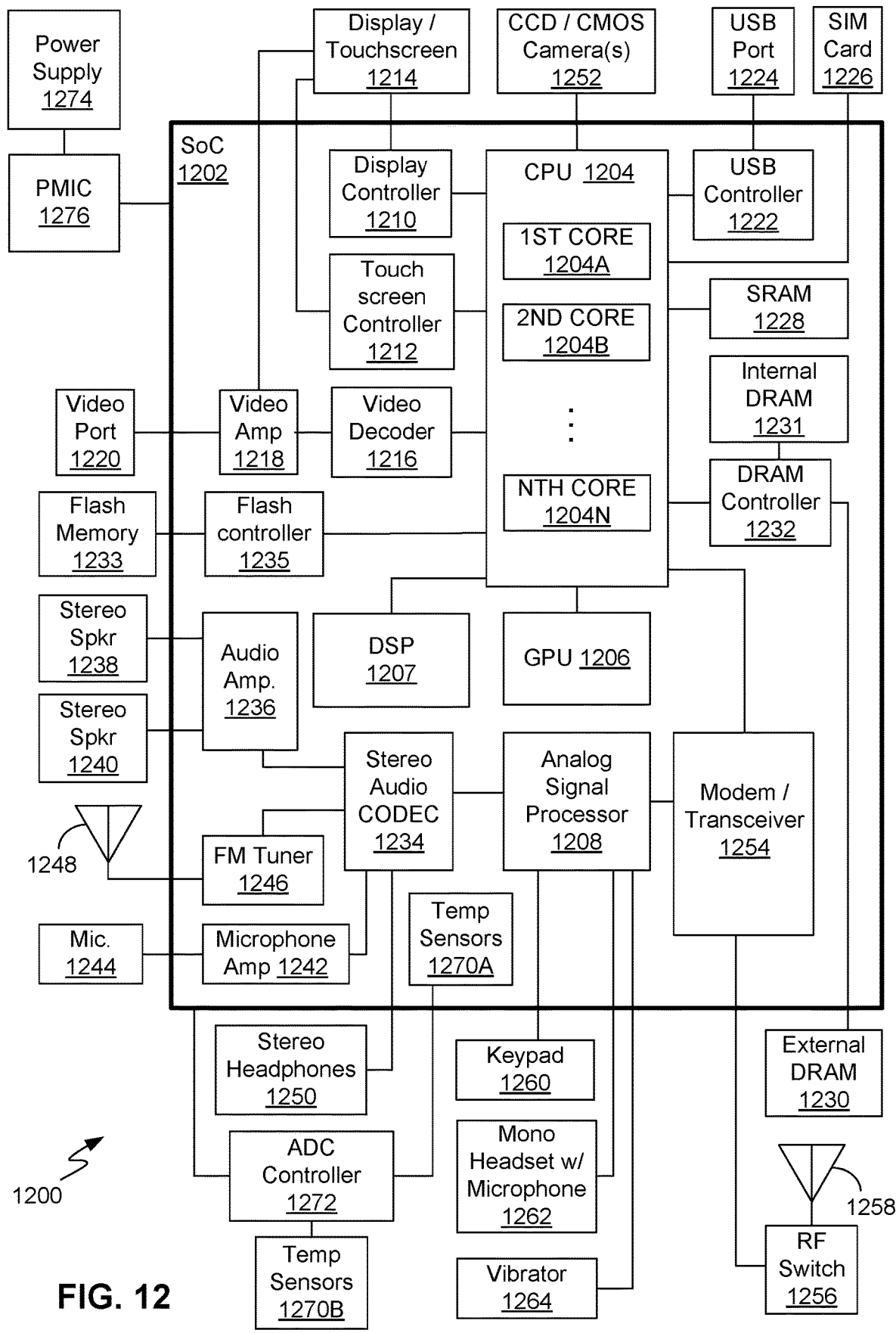
FIG. 12 is block diagram of a portable computing device, in accordance with exemplary embodiments.

FIG. 12 illustrates an example of a PCD 1200, such as a mobile phone, in which exemplary embodiments of systems, methods, computer-readable media, and other examples of protecting data and accessing data in a flash memory may be provided. For purposes of clarity, some data communication interconnects, clock signals, power supply voltages, etc., are not shown in FIG. 12.

The PCD 1200 may include an SoC 1202. The SoC 1202 may include a CPU 1204, a GPU 1206, a DSP 1207, an analog signal processor 1208, a modem/modem subsystem 1254, or other processors. The CPU 1204 may include one or more CPU cores, such as a first CPU core 1204A, a second CPU core 1204B, etc., through an Nth CPU core 1204N. The SoC 1202 may be an example of the SoC 101 described above with regard to FIG. 1. The CPU 1204 or one or more of its cores 1204A-1204N may be an example of the processor 104 described above with regard to FIG. 1.

A display controller 1210 and a touch-screen controller 1212 may be coupled to the CPU 1204. A touchscreen display 1214 external to the SoC 1202 may be coupled to the display controller 1210 and the touch-screen controller 1212. The PCD 1200 may further include a video decoder 1216 coupled to the CPU 1204. A video amplifier 1218 may be coupled to the video decoder 1216 and the touchscreen display 1214. A video port 1220 may be coupled to the video amplifier 1218. A universal serial bus ("USB") controller 1222 may also be coupled to CPU 1204, and a USB port 1224 may be coupled to the USB controller 1222. A subscriber identity module ("SIM") card 1226 may also be coupled to the CPU 1204.

One or more memories may be coupled to the CPU 1204. The one or more memories may include both volatile and non-volatile memories. Examples of volatile memories include static random access memory ("SRAM") 1228 and DRAM 1230 and 1231. Such memories may be external to the SoC 1202, such as the DRAM 1230, or internal to the SoC 1202, such as the DRAM 1231. A DRAM controller 1232 coupled to the CPU 1204 may control the writing of data to, and reading of data from, the DRAMs 1230 and 1231.

The memories may also include a flash memory device 1233. The flash memory device 1233 may be coupled with the CPU 1204 via a flash memory controller 1235. The flash memory device 1233 and flash memory controller 1235 may be examples of the flash memory device 102 and flash memory controller 106, respectively, described above with regard to FIG. 1. Accordingly, the flash memory device 1233 may be unmanaged or raw.

A stereo audio CODEC 1234 may be coupled to the analog signal processor 1208. Further, an audio amplifier 1236 may be coupled to the stereo audio CODEC 1234. First and second stereo speakers 1238 and 1240, respectively, may be coupled to the audio amplifier 1236. In addition, a microphone amplifier 1242 may be coupled to the stereo audio CODEC 1234, and a microphone 1244 may be coupled to the microphone amplifier 1242. A frequency modulation ("FM") radio tuner 1246 may be coupled to the stereo audio CODEC 1234. An FM antenna 1248 may be coupled to the FM radio tuner 1246. Further, stereo headphones 1250 may be coupled to the stereo audio CODEC 1234. Other devices that may be coupled to the CPU 1204 include one or more digital (e.g., CCD or CMOS) cameras 1252.

The modem subsystem or transceiver 1254 may be coupled to the analog signal processor 1208 and the CPU 1204. An RF switch 1256 may be coupled to the modem subsystem 1254 and an RF antenna 1258. In addition, a keypad 1260, a mono headset with a microphone 1262, and a vibrator device 1264 may be coupled to the analog signal processor 1208.

The SoC 1202 may have one or more internal or on-chip thermal sensors 1270A and may be coupled to one or more external or off-chip thermal sensors 1270B. An analog-to-digital converter ("ADC") controller 1272 may couple the off-chip thermal sensors 1270B to the SoC 1202 and convert voltage drops produced by the thermal sensors 1270A and 1270B to digital signals. A power supply 1274 and a PMIC 1276 may supply power to the SoC 1202.

The PCD 1200 is only one example of a computing device in which exemplary embodiments of systems, methods, computer-readable media, and other embodiments of protecting and accessing protected data in flash memory may be provided. Other examples may include other types of computing devices or computing systems, such as those used in datacenter, automotive, IoT and other contexts. For example, IoT devices may be manufactured more economically using unmanaged or raw flash memory devices instead of managed flash memory devices.

Firmware or software may be stored in any of the above-described memories, such as DRAM 1230 or 1231, SRAM 1228, flash memory 1233, etc., or may be stored in a local memory (not shown) directly accessible by the processor hardware on which the software or firmware executes. Execution of such firmware or software may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

Implementation examples are described in the following numbered clauses:

1. A method for accessing protected data in a flash memory device of a computing device, comprising:
   determining a location of a block in the flash memory device using dummy bad block indicator information, the block having a bad block marker stored therein; and
   reading data stored in data portions of a plurality of pages of the block.

2. The method of clause 1, wherein determining the location of the block in the flash memory device comprises reading the dummy bad block indicator information from a partition table, the dummy bad block indicator information indicating a start block and an end block.

3. The method of any of clauses 1-2, wherein determining the location and reading the data are performed during a boot-up of the computing device.

4. The method of any of clauses 1-3, wherein reading the data comprises reading a configuration data table, and the boot-up uses the configuration data table.

5. The method of clause 1, wherein determining the location of the block in the flash memory device comprises:
   reading a bad block marker portion of each block in the flash memory;
   reading information from a data portion of each block having a bad block marker stored in the bad block marker portion of the block; and
   determining whether the information read from the data portion comprises the dummy bad block indicator information.

6. The method of clause 5, wherein determining the location and reading the data are performed during a boot-up of the computing device.

7. The method of any of clauses 5-6, wherein reading the data comprises reading a configuration data table, and the boot-up uses the configuration data table.

8. The method of any of clauses 1-7, wherein the computing device comprises an Internet of Things (IoT) device.

9. A system for accessing protected data in a flash memory device of a computing device, comprising:
   an unmanaged flash memory device; and
   a processor configured to:
   determine a location of a block in the flash memory device using dummy bad block indicator information, the block having a bad block marker stored therein; and
   read data stored in data portions of a plurality of pages of the block.

10. The system of clause 9, wherein the processor being configured to determine the location of the block in the flash memory device comprises the processor being configured to read the dummy bad block indicator information from a partition table, the dummy bad block indicator information indicating a start block and an end block.

11. The system of any of clauses 9-10, wherein the processor is configured to determine the location and read the data during a boot-up of the computing device.

12. The system of any of clauses 9-11, wherein the processor being configured to read the data comprises the processor being configured to read a configuration data table and use the configuration data table in the boot-up.

13. The system of clause 9, wherein the processor being configured to determine the location of the block in the flash memory device comprises the processor being configured to:
   read a bad block marker portion of each block in the flash memory;
   read information from a data portion of each block having a bad block marker stored in the bad block marker portion of the block; and
   determine whether the information read from the data portion comprises the dummy bad block indicator information.

14. The system of clause 13, wherein the processor is configured to determine the location and read the data during a boot-up of the computing device.

15. The system of any of clauses 13-14, the processor being configured to read the data comprises the processor being configured to read a configuration data table and use the configuration data table in the boot-up.

16. The system of any of clauses 9-15, wherein the computing device comprises an Internet of Things (IoT) device.

17. A system for accessing protected data in a flash memory device of a computing device, comprising:
   means for determining a location of a block in the flash memory device using dummy bad block indicator information, the block having a bad block marker stored therein; and
   means for reading data stored in data portions of a plurality of pages of the block.

18. The system of clause 17, wherein the means for determining the location of the block in the flash memory device comprises means for reading the dummy bad block indicator information from a partition table, the dummy bad block indicator information indicating a start block and an end block.

19. The system of any of clauses 17-18, wherein the means for determining the location and reading the data determine the location and read the data during a boot-up of the computing device.

20. The system of any of clauses 17-19, wherein the means for reading the data comprises means for reading a configuration data table, and the boot-up uses the configuration data table.

21. The system of clause 17, wherein the means for determining the location of the block in the flash memory device comprises:
   means for reading a bad block marker portion of each block in the flash memory;
   means for reading information from a data portion of each block having a bad block marker stored in the bad block marker portion of the block; and
   means for determining whether the information read from the data portion comprises the dummy bad block indicator information.

22. The system of clause 21, wherein the means for determining the location and reading the data determine the location and read the data during a boot-up of the computing device.

23. The system of any of clauses 21-22, wherein the means for reading the data comprises means for reading a configuration data table, and the boot-up uses the configuration data table.

24. An unmanaged flash memory device, comprising:
   an interface coupled to a memory controller; and
   a flash storage medium comprising a plurality of blocks, each block comprising a plurality of pages, a portion of the plurality of blocks comprising a protected data region;
   wherein a bad block marker is stored in a bad block marker portion of each block of the portion of the plurality of blocks; and
   wherein dummy bad block indicator information is stored in a data portion of a page of each block having the bad block marker stored in the bad block marker portion of the block.

25. The unmanaged flash memory device of clause 24, wherein the dummy bad block indicator information comprises a unique data pattern.

26. The unmanaged flash memory device of any of clauses 24-25, wherein the unique data pattern indicates a protected data type.

27. The unmanaged flash memory device of any of clauses 24-26, wherein the protected data region comprises non-contiguous blocks.

28. The unmanaged flash memory device of any of clauses 24-27, wherein the dummy bad block indicator information comprises a value indicating a data order.

29. The unmanaged flash memory device of any of clauses 24-28, wherein the unmanaged flash memory device is included in a computing device.

30. The unmanaged flash memory device of any of clauses 24-29, wherein the computing device comprises an Internet of Things (IoT) device.

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A method for creating and accessing protected data in an unmanaged flash memory device of a computing device, comprising:
   storing protected data within the unmanaged flash memory device that is associated with a bad block marker and dummy bad block indicator information;
   generating the bad block marker and dummy bad block indicator information, the dummy bad block indicator information comprises a unique data pattern that provides location information for the protected data stored in each page associated with a respective bad block marker;
   determining how many blocks within the unmanaged flash memory device are needed for the protected data that is associated with the bad block marker and dummy bad block indicator information, the protected data being accessible by a processor when read by a flash driver that reads all blocks within the flash memory device including one or more blocks flagged by the bad block marker;
   reading data from the unmanaged flash memory device including the protected data associated with the bad block marker and dummy bad block indicator information and maintaining a count of erase cycles for each block of the unmanaged flash memory device;
   determining a location of the protected data associated with the bad block marker and dummy bad block indicator information in the unmanaged flash memory device by using dummy bad block indicator information read from a partition table, the dummy bad block indicator information indicating a start block and an end block; and
   reading the protected data associated with the bad block marker and dummy bad block indicator information, wherein the blocks of the unmanaged flash memory device comprise non-contiguous blocks, the dummy bad block indicator information comprises one or more values indicating a data order for restoring a configuration data table.

2. The method of claim 1, wherein determining the location and reading the protected data are performed during a boot-up of the computing device.

3. The method of claim 2, further comprising restoring the configuration data table from the protected data, and the boot-up uses the configuration data table.

4. The method of claim 1, wherein determining the location of the protected data associated with the bad block marker and dummy bad block indicator information in the unmanaged flash memory device comprises:
   reading a bad block marker portion of each block in the unmanaged flash memory device;
   reading information from a data portion of each block having a bad block marker stored in the bad block marker portion of the block; and
   determining whether the information read from the data portion comprises the dummy bad block indicator information.

5. The method of claim 4, wherein determining the location and reading the protected data are performed during a boot-up of the computing device.

6. The method of claim 5, further comprising restoring the configuration data table, and the boot-up uses the configuration data table.

7. The method of claim 1, wherein the computing device comprises an Internet of Things (IOT) device.

8. A system for creating and accessing protected data in an unmanaged flash memory device of a computing device, comprising:
an unmanaged flash memory device; and
a processor configured to:
execute a software flashing tool and a flash driver;
the software flashing tool storing protected data within the unmanaged flash memory device that is associated with a bad block marker and dummy bad block indicator information;
the software flashing tool generating the bad block marker and dummy bad block indicator information, the dummy bad block indicator information comprises a unique data pattern that provides location information for the protected data stored in each page associated with a respective bad block marker portion;
the software flashing tool determining how many blocks within the flash memory device are needed for the protected data that is protected by the bad block marker and dummy bad block indicator information, the protected data being accessible by the processor when read by the flash driver that reads all blocks within the unmanaged flash memory device including one or more blocks flagged by the bad block marker;
the flash driver reading data from the unmanaged flash memory device including the protected data associated with the bad block marker and dummy bad block indicator information, the flash driver maintaining a count of erase cycles for each block of the unmanaged flash memory device;
the flash driver determining a location of the protected data associated with the bad block marker and dummy bad block indicator information in the unmanaged flash memory device by using dummy bad block indicator information read from a partition table, the dummy bad block indicator information indicating a start block and an end block; and
reading with the flash driver the protected data associated with the bad block marker and dummy bad block indicator information, wherein the blocks of the unmanaged flash memory device comprise non-contiguous blocks, the dummy bad block indicator information further comprising one or more values indicating a data order for restoring a configuration data table.

9. The system of claim 8, wherein the flash driver is configured to determine the location and read the data during a boot-up of the computing device.

10. The system of claim 9, wherein the flash driver is configured to restore the configuration data table and use the configuration data table in the boot-up.

11. The system of claim 8, wherein the flash driver is configured to:
read a bad block marker portion of each block in the unmanaged flash memory device;
read information from a data portion of each block having a bad block marker stored in the bad block marker portion of the block; and
determine whether the information read from the data portion comprises the dummy bad block indicator information.

12. The system of claim 11, wherein the flash driver is configured to determine the location and read the data during a boot-up of the computing device.

13. The system of claim 12, the flash driver is configured to restore the configuration data table and use the configuration data table in the boot-up.

14. The system of claim 8, wherein the computing device comprises an Internet of Things (IOT) device.

15. An unmanaged flash memory system, comprising:
an interface coupled to a memory controller;
the memory controller being coupled to a processor;
a software flashing tool being executed by the processor and storing protected data within a raw flash storage medium that is associated with a bad block marker and dummy bad block indicator information, the software flashing tool generating the bad block marker and dummy bad block indicator information, the software flashing tool determining how many blocks within the raw flash storage medium are needed for the protected data that is protected by the bad block marker and dummy bad block indicator information, the protected data being accessible by the processor when read by a flash driver that reads all blocks within the raw flash storage medium including one or more blocks flagged by the bad block marker;
the flash driver being executed by the processor and reading data from a partition table of the raw flash storage medium including the protected data associated with the bad block marker and dummy bad block indicator information, the dummy bad block indicator information further indicating a start block and an end block, the flash driver maintaining a count of erase cycles for each block of the raw flash storage medium; and
the raw flash storage medium coupled to the interface and comprising a plurality of blocks, each block comprising a plurality of pages, a portion of the plurality of blocks comprising the protected data that is associated with the bad block marker and dummy bad block indicator information;
wherein the bad block marker is stored in a bad block marker portion of each block of the portion of the plurality of blocks; and
wherein dummy bad block indicator information is stored in a data portion of a page of each block having the bad block marker stored in the bad block marker portion of the block, the dummy bad block indicator information comprises a unique data pattern that indicates a data type for the protected data stored in each page associated with a respective bad block marker portion, the dummy bad block indicator information and protected data being read-only and protected from erasure within the raw flash storage medium because of a respective bad block marker present with the bad block marker portion of a respective block, wherein the plurality of blocks of the raw flash storage medium comprise non-contiguous blocks, the dummy bad block indicator information further comprising one or more values indicating a data order for restoring a configuration data table.

16. The unmanaged flash memory system of claim 15, wherein the dummy bad block indicator information provides location information for the protected data stored in each page associated with a respective bad block marker portion.

17. The unmanaged flash memory system of claim 16, wherein the unique data pattern indicates that the protected data comprises the configuration data table.

18. The unmanaged flash memory system of claim 15, wherein the unmanaged flash memory system is part of a computing device.

19. The unmanaged flash memory system of claim 18, wherein the computing device comprises an Internet of Things (IOT) device.

\* \* \* \* \*